United States Patent
Janneteau et al.

(10) Patent No.: US 7,707,313 B2
(45) Date of Patent: Apr. 27, 2010

(54) SYSTEM AND METHOD FOR ROUTING AND DOMAIN NAME SYSTEM SUPPORT OF A MOBILE NODE

(75) Inventors: Christophe Janneteau, Bois D'Arcy (FR); Vidya Narayanan, San Diego, CA (US); George Popovich, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 888 days.

(21) Appl. No.: 11/464,342

(22) Filed: Aug. 14, 2006

(65) Prior Publication Data

US 2008/0037479 A1     Feb. 14, 2008

(51) Int. Cl.
  G06F 15/16  (2006.01)
  H04W 4/00  (2006.01)
(52) U.S. Cl. .................. 709/245; 709/227; 455/433
(58) Field of Classification Search .................. None
  See application file for complete search history.

(56) References Cited

U.S. PATENT DOCUMENTS

| | | | | |
|---|---|---|---|---|
| 6,614,774 | B1 * | 9/2003 | Wang | 370/338 |
| 6,654,607 | B1 * | 11/2003 | Shobatake et al. | 455/433 |
| 6,804,221 | B1 | 10/2004 | Magret | |
| 6,922,728 | B2 * | 7/2005 | Cho | 709/227 |
| 6,988,146 | B1 * | 1/2006 | Magret et al. | 709/245 |
| 7,016,682 | B2 * | 3/2006 | Won et al. | 709/245 |
| 7,035,940 | B2 * | 4/2006 | Sahasrabudhe et al. | 709/245 |
| 2002/0143919 | A1 | 10/2002 | Duque | |
| 2003/0018715 | A1 | 1/2003 | O'Neil | |
| 2003/0095522 | A1 | 5/2003 | Korus | |

OTHER PUBLICATIONS

"Cisco IOS Software 12.2 T Early Deployment Release Series", Oct. 10, 2001, Product Bulletin No. 1363, pp. 1-69.*
"Cisco Mobile Networks", 2007, Cisco Systems, pp. 1-26.*
Ng et al., "Taxonomy of Route Optimization Models in the NEMO Context", Oct. 25, 2004, Internet Draft, pp. 1-40.*
PCT Search Report Dated Jul. 18, 2008.

* cited by examiner

Primary Examiner—Hassan Phillips
(74) Attorney, Agent, or Firm—Randi L. Karpinia; Anthony P. Curtis (57) ABSTRACT

System and method are provided for establishing internet protocol (IP) communication between a mobile node (MN) and one or more mobile networks. The method includes receiving (100) a request from a MN when the MN joins a first mobile network, creating (105) routing information indicating a home address of the MN, and announcing (110) the home address to the nodes of the mobile network(s). The request indicates the home address of the MN.

24 Claims, 8 Drawing Sheets

SYSTEM AND METHOD FOR ROUTING AND DOMAIN NAME SYSTEM SUPPORT OF A MOBILE NODE

FIELD OF THE INVENTION

The present invention relates generally to network communications and more particularly to routing communication between a mobile node and one or more nodes in a mobile network or a foreign domain.

BACKGROUND

A mobile network is a network whose hosts and routers are usually static (e.g., non-mobile) with respect to each other, but are collectively mobile with respect to the rest of the Internet. For example, a mobile network might be found in an airplane, a ship, or a train. In general, a mobile router provides mobility (e.g., connection to the Internet Protocol (IP) infrastructure) for the nodes attached to the mobile router using, for example, mobile IP or network mobility (NEMO) protocols. A specific node in the mobile network is typically designated the mobile router and manages the mobility for all of the nodes within the mobile network, and thus a mobile network can change the point of attachment to the IP infrastructure while maintaining IP communication between nodes inside the mobile network and corresponding nodes connected to the Internet. When the mobile router moves from one IP subnet to another, the mobile router is typically required to handle mobility so as to maintain all of the communication of the nodes attached to the mobile router.

Mobile networks may take a variety of configurations such as a nested mobile network configuration where at least one first mobile network is attached under a second mobile network. For example, the first mobile network may be an individual carrying a device having an associated personal network, and the second mobile network may be a train having a mobile network infrastructure with connectivity to an IP network or infrastructure. When the individual enters the train, the mobile network of the individual can communicatively couple to an access point deployed in the train to operate within the mobile network of the train. Each mobile network has one or more local fixed nodes (LFNs) (e.g., a wireless device) that may be connected to the mobile router of the corresponding mobile network, such as by Ethernet or 802.11. The LFN has an IP address that belongs to the IP subnet(s) of the mobile network and has no specific IP mobility support. Each mobile network can also have one or more home mobile nodes (HMNs) that may be connected to the mobile router of the corresponding mobile network. An HMN is referred to herein as a mobile node (typically running Mobile IP protocol) having a home network that is the mobile network to which the HMN is attached. The HMN has a home address that belongs to the IP subnet(s) of the mobile network and has the same home agent (HA) as the HA of the mobile router of the corresponding home mobile network (i.e., the home agent of the HMN is not in the home mobile network of the HMN). Each mobile network can also have one or more visiting mobile nodes (VMNs) that may be connected to the mobile router of the corresponding mobile network. A VMN is referred to herein as a mobile node (typically running Mobile IP) attached to a mobile network that is not in the home network of the VMN. The VMN has a home address, and configures a temporary address, or care-of address, that belongs to the IP subnet(s) of the mobile network to which the VMN is attached. A Vehicular Area Network (VAN) having a mobile network deployed in a vehicle is an example of a mobile network in practice.

Prior to establishing IP communication with a destination node, the destination hostname is resolved into the IP address associated with the destination node, referred to as "name resolution", unless the IP address is previously known. One or more domain name system (DNS) servers may be used for a successful name resolution and typically involves a set of intermediate DNS servers having connectivity with one another to enable name resolution. For example, a mobile router has connectivity with a first DNS server, and the first DNS server has connectivity with a second DNS server that is authoritative for the destination node.

This name resolution is then used to establish IP communication. Mobile IP or NEMO protocols support routing between a node in one mobile network of a group of mobile networks with a node in another mobile network of the group of mobile networks using home agents to establish communication between the two nodes. A home agent is referred to herein as a node in the IP infrastructure that intercepts communication addressed to a particular LFN and re-directs the communication to the current location of the mobile router associated with the LFN.

Mobile nodes in an IP network are supported using a mobile IP protocol which allows a mobile node to change from one IP subnet to another while maintaining on-going communication. The mobile node has a permanent address, or a home address, that is used for communication. Each time the mobile node attaches to a new access point, a new temporary address, or care-of address, is assigned to the mobile node. The mobile node sends a binding between the home address and the care-of address to a server in the network, or a home agent. When a node in the Internet attempts to send a packet to the home address of a target mobile node, the packet is routed to the home network of the mobile node where the home agent intercepts the packet. The home agent, using the binding received from the mobile node, tunnels the packet to the care-of address of the mobile node so as to re-direct the packet to the current location of the mobile node. For example, standard node mobility protocols (e.g., mobile IP) and network mobility protocol (e.g., NEMO) utilize a bi-directional tunnel between the home agent and the mobile entity to maintain on-going communications as the mobile entity changes points of attachment to the IP infrastructure. This routing is complex, particularly for communications between a fixed node (e.g., a local fixed node (LFN)) in the mobile network and a visiting mobile node or between two visiting mobile nodes attached to the mobile network.

When establishing communication between an LFN and a visiting mobile node in a mobile network, the LFN sends the communication packet to the home address of the visiting mobile node. For example, the LFN sends the packet to a default router (e.g., a mobile router (MR1)), and the default router applies the mobile IP mechanism and tunnels the packet to a home agent (e.g., a mobile router home agent) in the mobile router home link. The mobile router home agent de-encapsulates the packet and sends the packet via the Internet to the home link of the visiting mobile node associated with the home address. At the home link of the visiting mobile node, the home agent of the visiting mobile node intercepts the packet when the visiting mobile node is not attached to the home link and tunnels the packet (first encapsulation) to the care-of address of the visiting mobile node. This care-of address of the visiting mobile node belongs to the mobile network. The tunneled packet from the home agent of the visiting mobile node is routed to the home link of the mobile router. The home agent of the mobile router intercepts the packet and tunnels the packet (second encapsulation) to the current location of the mobile router. The mobile router de-encapsulates the packet (e.g., removes the second encapsulation from the home agent of the mobile router) and sends the packet to the visiting mobile node. The visiting mobile node removes the remaining first encapsulation from its home agent and retrieves the initial packet sent by the LFN. This routing through the home agents located in the IP infrastructure places overhead on the radio interface between the mobile router and the IP infrastructure because packets to be routed between the visiting mobile node and the local fixed node will be sent twice over this interface (e.g., in the upstream and downstream directions). Additionally, overhead is introduced on the radio interface between the mobile router and the IP infrastructure because of the encapsulations used for routing the packets (e.g., bandwidth consumption).

In a conventional mobile network, while the mobile router having connectivity to the IP infrastructure maintains this connectivity, communication may be established between nodes of the mobile network (e.g., LFNs and VMNs) using conventional mobile IP. When the mobile router loses this connectivity, the mobile network is isolated and referred to as "autonomous". When the mobile network is in an autonomous mode, the mobile network is disconnected from the IP infrastructure and the corresponding home agent, and the home agents (e.g., of VMNs) are not reachable by the mobile router. Currently, conventional protocols, such as Mobile IP and NEMO, do not support the transmission of data packets (i.e., routing) between two nodes in an autonomous mode. In addition, the node initiating the communication may generally know the fully qualified domain name (FQDN) of the destination node but may not know the IP address of the destination node. With the loss of connectivity to the IP infrastructure, the nodes of the mobile networks (e.g., LFNs) lose access to DNS servers (e.g., default DNS servers, authoritative DNS servers, and intermediate DNS servers) that would otherwise be used for name resolution of the FQDN of the destination node (e.g., VMNs) into the IP address of the destination node.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

Before describing in detail embodiments that are in accordance with the present invention, it should be observed that the embodiments reside primarily in combinations of method steps and apparatus components related to routing and domain name service support of a mobile node. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may comprise one or more conventional processors and unique stored program instructions that control the one or more processors to implement, in conjunction with certain non-processor circuits, some, most, or all of the functions for routing and domain name service support of a mobile node as described herein. The non-processor circuits may include, but are not limited to, a radio receiver, a radio transmitter, signal drivers, clock circuits, power source circuits, and user input devices. As such, these functions may be interpreted as steps of a method for routing and domain name service support of a mobile node. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits (ICs) with minimal experimentation.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

Methods and apparatus are provided which enable internet protocol (IP) communication between a mobile node and nodes of one or more mobile networks having a mobile router. When a mobile node (e.g., a visiting mobile node (VMN)) joins or attaches to a mobile network, the mobile node initially sends a request for a temporary address (e.g., a care-of address) to be used for IP communication with the mobile node. Typically, the VMN undergoes an exchange during a care-of address acquisition phase. The request includes a permanent IP address (e.g., a home address) of the mobile node and, optionally, a corresponding fully qualified domain name (FQDN) of the mobile node. The home address of the mobile node is then supplied to the mobile router which creates/updates routing information for the home address of the mobile node. Additionally, the mobile router announces (e.g., multicasts) to the nodes (e.g., other VMNs) of the mobile network(s) that the home address of the mobile node is within the mobile network.

In one exemplary embodiment, the mobile network(s) includes, but is not necessarily limited to, a domain name system (DNS) server and a dynamic host configuration protocol (DHCP) server. The home address of the mobile node, and optionally the FQDN of the mobile node, is included in a DHCP request that is sent by the mobile node to the DHCP server. In the event the FQDN of the mobile node is provided in the DHCP request, the DHCP server updates the DNS server with an association between the home address and the FQDN of the mobile node. Including the home address, and optionally the FQDN, in the DHCP request decreases the VMN discovery process and minimizes the associated signaling. The methods and apparatus of the present invention support communication to and from a VMN in an autonomous mobile network by localizing, within the mobile network, the routing of communications between the mobile node and any other node in the mobile network. Additionally, the methods and apparatus of the present invention optimizes routing of packets to and from a mobile node and other nodes in the mobile network in a connected mode (e.g., having connectivity to the IP infrastructure).

Figure 1:
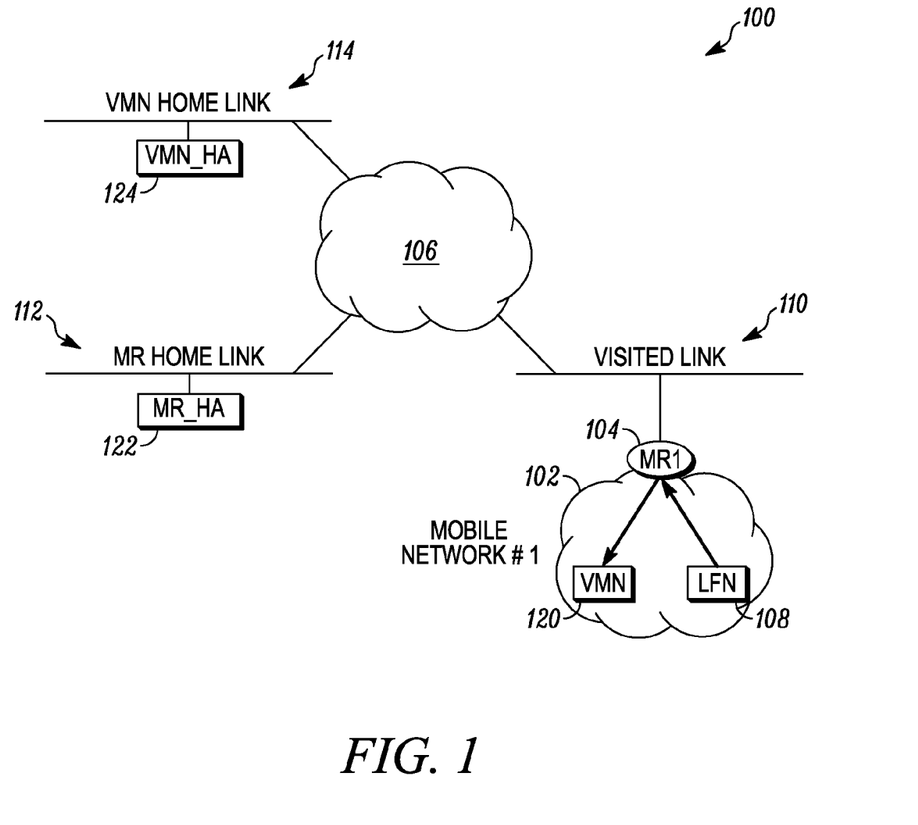
FIG. 1 is a block diagram of a mobile IP communication system.

FIG. 1 is a block diagram of a mobile IP communication system 100. The mobile IP communication system 100 comprises a mobile network 102 having a mobile router 104 (e.g., MR1) and one or more nodes, and an IP infrastructure 106 (e.g., the Internet) having connectivity with mobile network 102 using mobile router 104 via a visited link 110 when mobile network 102 is in a connected mode. In an autonomous mode, visited link 110 is omitted because mobile network 102 lack connectivity with IP infrastructure 106. Although mobile IP communication system 100 is described with mobile network 102, mobile IP communication system 100 may have additional mobile networks communicating with mobile network 102, such as a nested, a flat, or a mixed configuration of aggregated mobile networks.

In this exemplary embodiment, mobile network 102 comprises a local fixed node (LFN) 108 and a visiting mobile node (VMN) 120 attached to mobile network 102. Mobile router 104 provides mobility for the nodes attached to the particular mobile router (e.g., LFN and VMN) and can be collocated with the DHCP server and DNS server (not shown). The IP infrastructure 106 comprises home agents that correspond to one or more nodes of mobile network 102. For example, IP infrastructure 106 comprises a home agent (VMN_HA) 124 for visiting mobile node 120 and a home agent (MR_HA) 122 for mobile router 104. VMN_HA 124 is connected to IP infrastructure 106 via a VMN home link 114, and MR_HA 122 is connected to IP infrastructure 106 via a mobile router home link 112.

Although not shown, mobile router 104 comprises a central processing unit having one or more processors (e.g., microprocessors, reduced instruction set computer (RISC) chips, and the like) and a non-volatile memory (e.g., non-volatile random access memory (RAM) and/or read-only memory (ROM), a data storage device, and one or more communication interfaces (e.g., low/medium speed interfaces such as multiport communications interfaces, serial communications interfaces, or a token ring interface, high speed interfaces such as multiport Ethernet interfaces, wireless interfaces, and the like) typically provided as interface cards. The communication interfaces control communication intensive tasks such as packet switching and filtering, and media control and management. It will be appreciated by those of ordinary skill in the art that, alternatively, mobile router 104 may have a variety of other router architectures.

In an exemplary embodiment, IP communication routing to a visiting mobile node (e.g., VMN 120) is provided using a VMN home address option and/or a VMN FQDN option. With the VMN home address option, localized routing within the mobile network 102 is enabled (e.g., via the DHCP server) for the home address of VMN 120. Appropriate routing information is created on mobile router 104 to indicate the presence of VMN 120 and specify how packets should be routed to VMN 120. Using this routing information, mobile router 104 can route any packet addressed to the home address of VMN 120 that is sent by other nodes in mobile network 102. In one exemplary embodiment, a routing entry in the routing table of mobile router 104 is created using the home address of VMN 120 such that the home address of VMN 120 is directly accessible through one of the ingress interface of mobile router 104. In another exemplary embodiment, a tunnel on mobile router 104 is created between mobile router 104 and the care-of address of VMN 120 using an association between the home address of VMN 120 and the care-of address of VMN 120 (e.g., provided by the DHCP server). Any packet addressed to the home address of VMN 120 is forwarded through this tunnel. The presence of VMN 120 (e.g., the home address of VMN 120) is announced within mobile network 102, such as through a specific announcement message. Other VMNs in mobile network 102 can determine that VMN 120 is local and directly accessible using native routing (or tunneling to mobile router 104) instead of tunneling through a corresponding home agent.

With the VMN FQDN option, used in conjunction with the VMN home address option, the DNS server (e.g., associated with mobile network 102) is updated (e.g., via the DHCP server) with an association between the FQDN of VMN 120 and the home address of VMN 120. For example, this association may be placed in the master file of the DNS server (e.g., if conventional DNS Update is used) or in the DNS cache of the DNS server. Any nodes in mobile network 102 can DNS-resolve the home address of VMN 120 from the FQDN of VMN 120 using conventional DNS query to the DNS server.

The VMN home address option and the VMN FQDN option are preferably carried over DHCP request messages to enable the creation and refreshing of the associated states on mobile router 104 and the DNS server (i.e., routing information on mobile router 104 and the VMN home address/FQDN association on the DNS server). The creation of these states occurs during the early DHCP exchange of the VMN care-of address acquisition phase. The refreshing of these states is achieved by including the DHCP options in subsequent DHCP request messages sent to renew the care-of address of VMN 120. The home address of VMN 120 and the FQDN of VMN 120 are carried over DHCP release messages to trigger the removal of the associated states on mobile router 104 and the DNS server.

Figure 2:
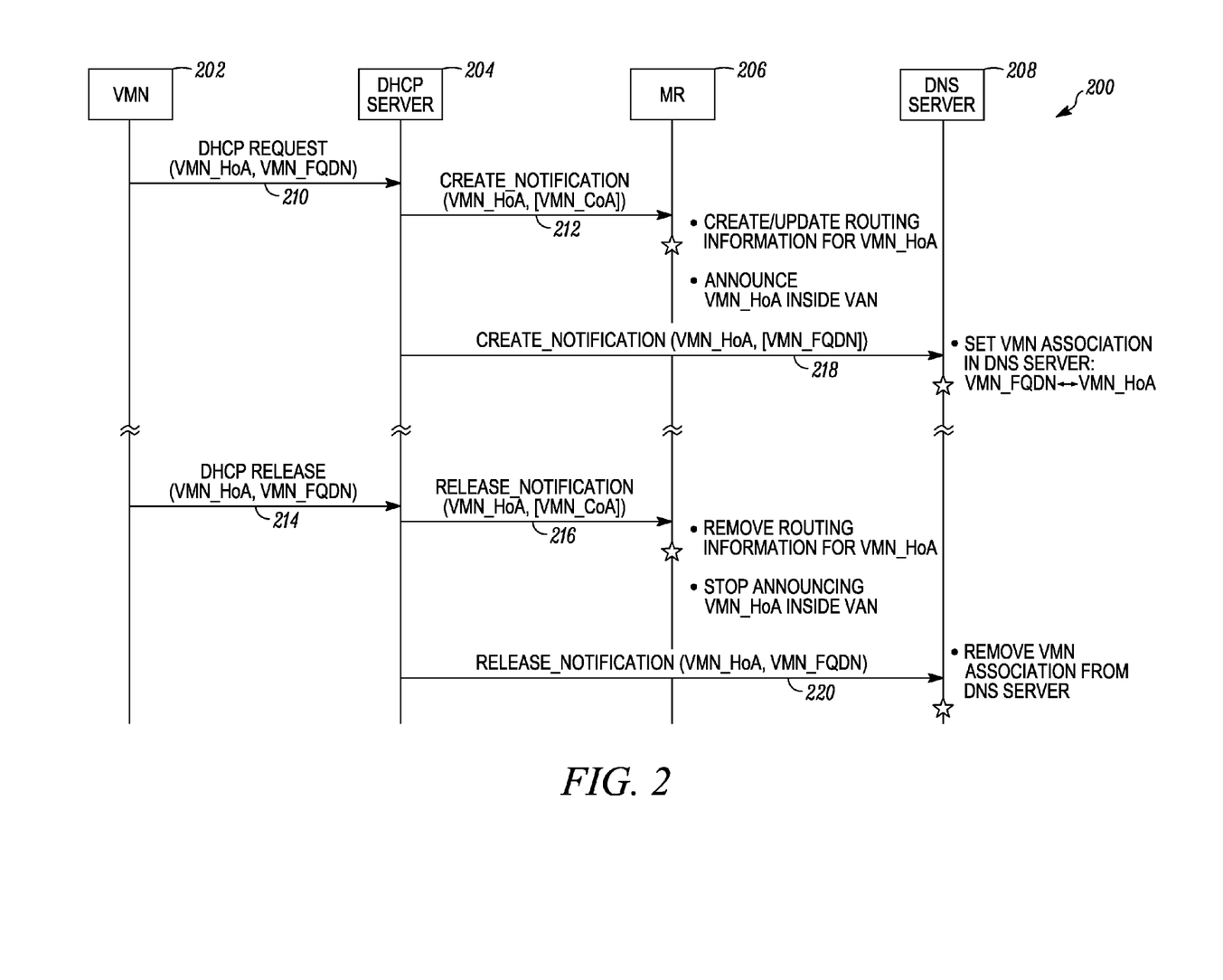
FIG. 2 is a signaling diagram illustrating an exemplary IP communication routing in a mobile network.

FIG. 2 is a signaling diagram illustrating an exemplary IP communication routing in a mobile network 200, such as mobile network 102 shown in FIG. 1. Mobile network 200 comprises a VMN 202, a DHCP server 204, an MR 206, and a DNS server 208. Although mobile network 200 is shown with VMN 202, mobile network 200 may have any number of nodes or VMNs. DHCP server 204 and DNS server 208 are collocated with MR 206 and coupled via a communication bus (not shown), although DHCP server 204 and DNS server 208 may reside on different nodes of mobile network 200. DHCP server 204 allocates care-of addresses to VMN 202, and DNS server 208 responds to standard DNS queries from any nodes (not shown) within mobile network 200.

Although not shown, DNS server 208 includes a memory having one or more DNS caches and one or more zone files for storing resource records (RRs). The RRs include, but are not necessarily limited to, a name server resource record ("NS" RR) and an IP address resource record ("A" RR). DNS server 208 manages an "NS" RR that maps the domain name served by DNS server 208 to the name of DNS server 208. Additionally, DNS server 208 manages one or more "A" RRs for each node whose home network is mobile network 200 respectively, and each "A" RR maps the FQDN of a particular node to a corresponding IP address. Using the zone file, DNS server 208 of mobile network 200 can authoritatively respond to any DNS query relating to the nodes of mobile network 200. In an exemplary embodiment, DNS server 208 is authoritative for the domain name of the mobile network 200 and may be authoritative for other domain names of other mobile networks that may be coupled to mobile network 200. For example, the DNS server 208 collocated with MR 206 is authoritative for the domain name of the mobile network 202 and thus, manages a zone file encompassing the FQDN of any LFN and any mobile node having mobile network 200 as a home network.

When VMN 202 attempts to attach or join mobile network 200, VMN 202 detects an entry to mobile network 200 by receiving an announcement message. For example, MR 206 sends a mobile network announcement each time a new node joins mobile network 200 or each time a VMN successfully attaches to mobile network 200 (e.g., during a network access control phase). In another example, MR 206 sends a mobile network announcement when receiving a DHCP discover (e.g., typically from a new VMN trying to obtain a new care-of address). The mobile network announcement includes, but is not limited to, a directly reachable networks (DRN) list having a list of home addresses of VMNs currently in mobile network 200 and the prefix of mobile network 200. VMN 202 retrieves this list of home addresses of VMNs in mobile network 200 and the prefix for mobile network 200. Using this information, VMN 202 determines whether a packet to a given node should be tunneled to the home agent of VMN 202 (e.g., in the event this node is not in mobile network 200) or natively routed according to the routing table of VMN 202 (e.g., in the event the node is within mobile network 200).

With the VMN home address option, VMN 202 preferably uses DHCP to simultaneously notify MR 206 of the presence of VMN 202 and obtain a care-of address. VMN 202 uses a DHCP request 210 to notify MR 206 of the home address (VMN_HoA) of VMN 202. For example, VMN 202 sends a DHCP request 210 including VMN_HoA to DHCP server 204, and DHCP server 204 creates and sends a notification 212 to MR 206 that includes VMN_HoA and, optionally, the care-of address (VMN_CoA) allocated to VMN 202. Upon receiving (and accepting) this VMN home address option, MR 206 creates a specific entry in its routing table that indicates the home address of VMN 202 as directly reachable through an ingress interface of MR 206. MR 206 uses this entry to route packets to the home address of VMN 202 by resolving the layer-2 address of VMN 202 from the home address of VMN 202. In one exemplary embodiment, MR 206 uses the address resolution protocol (ARP) to resolve the layer-2 address of VMN 202. In another exemplary embodiment, MR 206 retrieves the layer-2 address of VMN 202 from a local cache on MR 206 which is updated dynamically with the layer-2 address of VMN 202 at the time MR 206 receives the notification from DHCP server 204 about the presence of VMN 202 in the mobile network, the notification including the layer-2 address of VMN 202. DHCP server 204 sends a DHCP acknowledgement to VMN 202 that includes, but is not necessarily limited to, the care-of address allocated to VMN 202, and an indication of whether the VMN home address option (e.g., in the DHCP request) has been accepted or rejected.

Upon a successful registration with MR 206, VMN 202 natively routes (instead of tunneling to the home agent of VMN 202) any packet having a destination address matching the DRN list. Additionally, MR 206 adds the home address of VMN 202 to the DRN list and sends a new mobile network announcement enabling other VMNs in mobile network 200 to discover the presence of VMN 202. In a connected mode of mobile network 200, VMN 202 registers the new care-of address with the home agent of VMN 202.

To route a packet from an LFN or a home mobile node (HMN) to another LFN/HMN, the packet is directly routed according to the routing table of the originating LFN/HMN. To route a packet from an LFN/HMN to a destination address lacking the prefix of mobile network 200, the packet is routed towards MR 206 (e.g., along a default route). Using the routing table of MR 206, MR 206 determines whether the destination matches on of the VMN routing entries. In the event a match is found, MR 206 resolves the layer-2 address of the corresponding VMN (e.g., from the home address of this VMN) and directly sends the packet to this VMN. In the event no matches are found, MR 206 forwards the packet through the tunnel to the home agent of MR 206 because the destination address corresponds to an out-of-mobile network node.

VMN 202 uses the information in the DRN list to determine whether a destination address corresponds to the home address of another VMN in mobile network 200 or corresponds to an LFN/HMN (e.g., via the prefix of mobile network 200 included in the DRN list). In the event no match is found, VMN 202 tunnels the packet to the home agent of VMN 202. In the event a match is found, VMN 202 natively routes the packet using the routing table of VMN 202. For example, in the event the destination address matches a routing entry for the mobile network subnet (e.g., configured from DHCP), VMN 202 uses ARP to resolve the layer-2 address of the destination. This destination is an LFN/HMN. Otherwise, the packet is sent to the layer-2 address of MR 206 (e.g., via the default route). This destination is another VMN.

MR 206 routes the packet to the destination through its ingress interface when the destination address matches one of the entries in the routing table of MR 206. In the event the destination address matches the prefix of mobile network 200, the packet is sent to the layer-2 address of the destination. This destination is an LFN/HMN. In the event the destination address matches one of the VMN routing entries, the packet is sent to the layer-2 address of the destination. Otherwise, MR 206 discards the packet.

When mobile network 200 recovers connectivity to the IP infrastructure, MR 206 can decide (e.g., as a matter of policy) whether to maintain localized routing for the home address of VMN 202. In the event MR 206 decides not to maintain localized routing for the home address of VMN 202, the VMN entry for VMN 202 is removed from the routing table of MR 206, the VMN home address is removed from the DRN list, and a new mobile network announcement may be sent. Periodic DHCP request/acknowledgement messages can be exchanged between VMN 202 and DHCP server 204 to renew the lease of the allocated care-of address and refresh the corresponding VMN entry in the routing table of MR 206.

When mobile network 200 is in a connected mode and VMN 202 leaves mobile network 200, VMN 202 notifies MR 206. MR 206 can then remove the corresponding VMN entry from the routing table of MR 206 to stop the local re-direction of packets sent to the home address of VMN 202. In this case, VMN 202 sends (e.g., unicasts) a DHCP release message 214 to DHCP server 204 that includes the home address of VMN 202 in a VMN home address option. This release message 214 can be sent by VMN 202 prior to leaving mobile network 200 (e.g., proactive handover) or just after leaving mobile network 200 (e.g., reactive handover). Upon receiving the DHCP release message 214, DHCP server 204 releases the care-of address for VMN 202 (e.g., by marking the care-of address as not allocated) that was allocated from the mobile network address space. DHCP server 204 sends a release notification 216 to MR 206, including the VMN home address and optionally the VMN care-of address. Receiving this indication, MR 206 removes the corresponding VMN entry in the routing table of MR 206, removes the home address of VMN 202 from the DRN list, and sends a new mobile network announcement. VMN 202 also clears any DRN list that VMN 202 may have acquired from MR 206. DHCP server 204 may also send a release notification 218 to DNS Server 208, including the home address and FQDN of VMN 202, when the DHCP release 214 includes the home address and FQDN of VMN 202 (e.g., VMN FQDN option).

With the VMN FQDN option, the cache of DNS server 208 is updated with an association between the hostname (e.g., FQDN) of VMN 202 and the home address of VMN 202. The VMN FQDN option is preferably used in conjunction with the VMN home address option (e.g., within the DHCP request and DHCP release messages sent by VMN 202 to DHCP server 204). In one exemplary embodiment, when receiving a DHCP request from a node with the VMN FQDN option, DHCP server 204 initially determines whether the DHCP request is accompanied by a VMN home address option. Without the VMN home address option, the VMN FQDN option is preferably ignored. In the event the VMN FQDN option is accompanied by the VMN home address option, DHCP server 204 updates DNS server 208 with an association 218 between the FQDN listed in the VMN FQDN option and the IP address listed in the VMN home address option. In the case of VMN 202 interacting with DHCP server 204, the association placed in DNS server 208 binds the FQDN of VMN 202 to the home address of VMN 202.

In general, a DHCP server receiving a DHCP request from a node with the VMN FQDN option (accompanied with the VMN home address option) uses standard dynamic DNS update mechanisms to update the DNS server (e.g., the primary authoritative DNS server for such node collocated with the mobile router) with the association between the FQDN of the node and the address of the node listed in the VMN home address option. In the autonomous mode, the DHCP server updates the DNS server with the association when the DNS server is the authoritative primary master server of the VMN. In one alternative embodiment, the cache of the DNS server (instead of a master file) is updated using an appropriate extension of the standard dynamic DNS update mechanism to realize dynamic DNS cache update. In another alternative embodiment, the cache of the DNS server is updated by other means (e.g., directly accessing/configuring the DNS cache with existing administrative tools, etc.). Once updated with the VMN association, and following the standard operations of a DNS server, the DNS server can answer name resolution queries for the hostname of the VMN.

MR 206 has fast VMN discovery because MR 206 can discover the home address of VMN 202 and the FQDN of VMN 202 during the early DHCP-based care-of address acquisition phase. Signaling overhead is minimized because separate Mobile IP and DNS update signaling is not needed between VMN 202 and MR 206, periodic refresh of the home address of VMN 202 and the FQDN of VMN 202 are included on the periodic renewal of the VMN care-of address.

Figure 3:
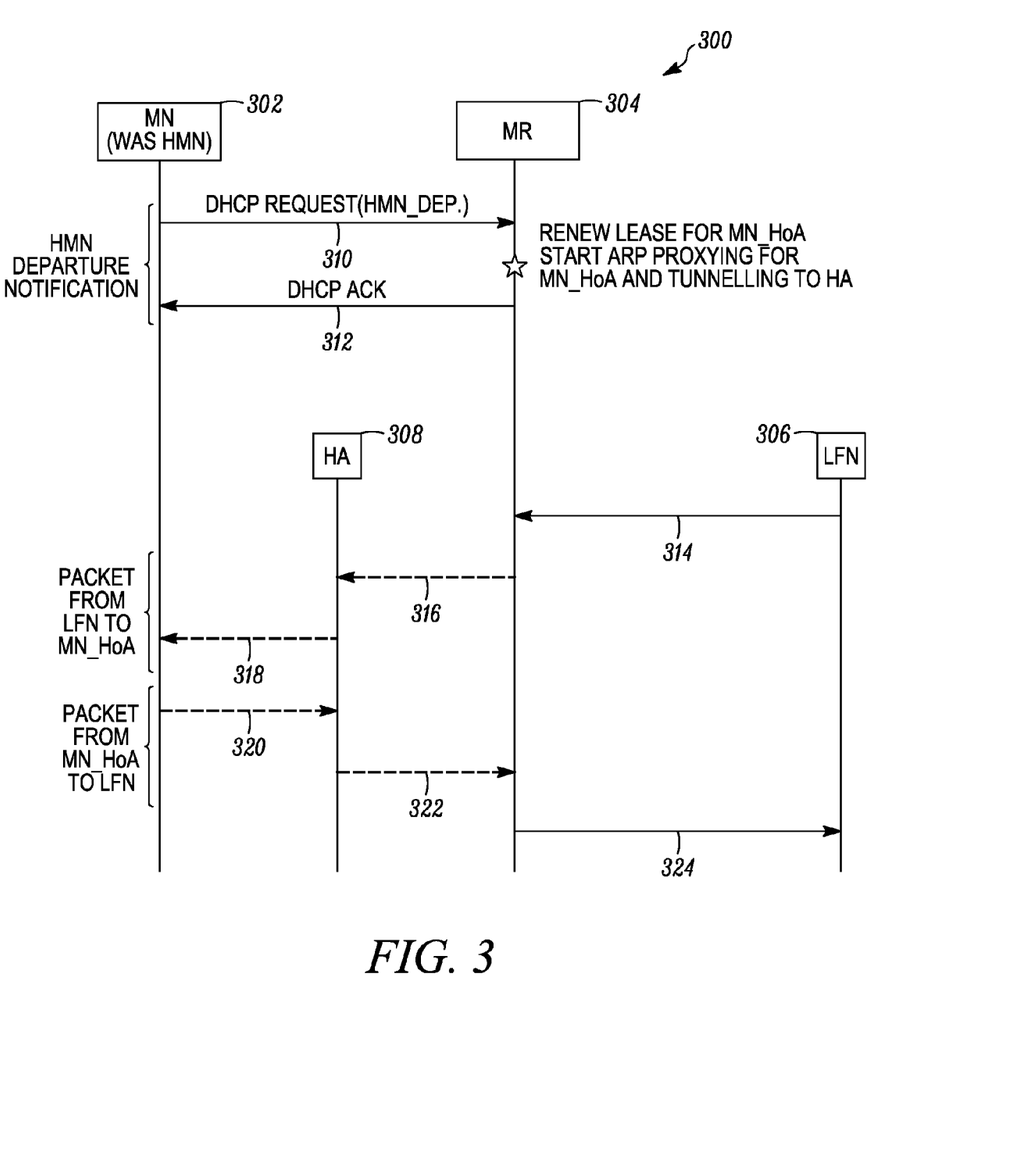
FIG. 3 is a signaling diagram illustrating an exemplary IP communication routing to a home mobile node departing from a home network.

FIG. 3 is a signaling diagram illustrating an IP communication routing to an HMN 302 departing from a home network 300 (such as mobile network 102 shown in FIG. 1). Home network 300 comprises an HMN 302, an MR 304, and an LFN 306. The home agent (HA) 308 of MR 304 is located on the home network of MR 304. A DHCP server (not shown) is collocated with MR 304. In this exemplary embodiment, the HMN departure option allows HMN 302 to notify the local DHCP server in the corresponding home network 300 about the departure of HMN 302 (e.g., either before or after actual departure). The HMN departure option is preferably performed using DHCP request messages, and the DHCP server can trigger any appropriate operation on MR 304 to enable communications between any local node of home network 300 and HMN 302. One example of such appropriate operation includes, but is not necessarily limited to, MR 304 initiating address resolution protocol (ARP) proxying for the home address of HMN 302 and tunneling packets addressed to HMN 302 towards HA 308.

In operation, HMN 302, referred to as a mobile node (MN) when leaving mobile network 300, directly sends a DHCP request 310 to MR 304 with a specific HMN departure option to indicate the departure of HMN 302. Upon receiving this DHCP request 310, MR 304 renews the lease of the home address of HMN 302 (e.g., indicated in the DHCP request 310) and sends a DHCP acknowledgement 312 to HMN 302. By processing the HMN departure option, MR 304 initiates ARP proxying for the home address of HMN 302 and tunnels packets addressed to this home address towards HA 308. For example, packets between LFN 306 (located in mobile network 300) and MN (formerly HMN 302) outside of the home mobile network (i.e., mobile network 300) are tunneled through HA 308, which is common to MN 302 and MR 304 serving mobile network 300, to MN 302 via signals 314, 316, and 318. The message used by HMN 302 to notify its departure to MR 304 can be a generic message instead of a specific extension of a DHCP message. Packets may also be tunneled through HA 308 to LFN 306 via signals 320, 322, and 324.

Figure 4:
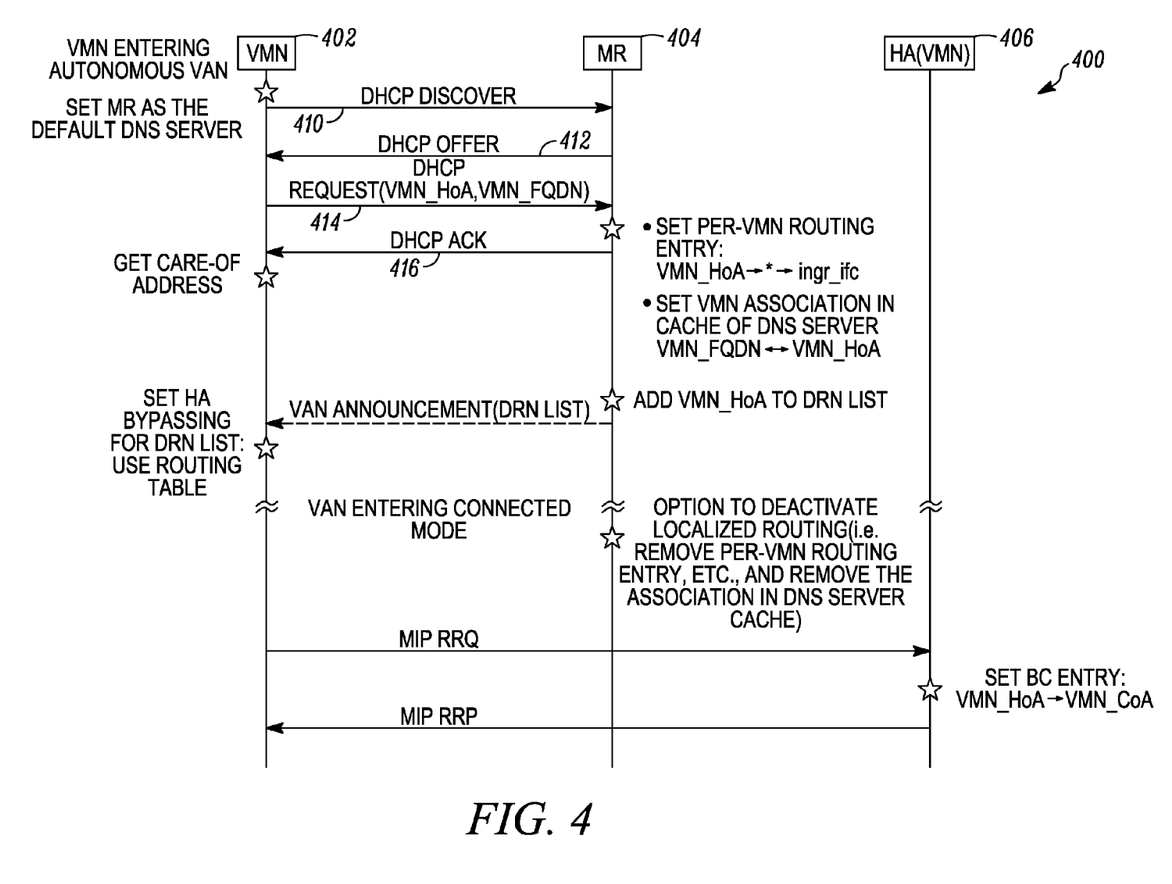
FIG. 4 is a signaling diagram illustrating an exemplary IP communication routing in an autonomous mobile network.

FIG. 4 is a signaling diagram of an exemplary IP communication routing in an autonomous mobile network 400. Mobile network 400 comprises a VMN 402 and an MR 404. HA 406 of VMN 402 is located on the home network of VMN 402. In this exemplary embodiment, MR 404 is collocated with a DHCP server and a DNS server (not shown). Conventional DHCP Discover and Offer messages 410, 412, respectively, are exchanged between VMN 402 and MR 404 when VMN 402 attempts to attach or join mobile network. VMN 402 uses the VMN FQDN option to update the cache of MR-collocated DNS server when the mobile network 400 enters the autonomous mode. VMN 402 uses a DHCP request 414 to notify MR 404 of the home address (VMN_HoA) and FQDN (VMN_FQDN) of VMN 402. Upon receiving (and accepting) this VMN home address option, MR 404 creates a specific entry in its routing table that indicates the home address of VMN 402 as directly reachable through an ingress interface of MR 404 and sends a DHCP acknowledgement 416 to VMN 402.

VMN 402 may also use this VMN FQDN option when VMN 402 enters mobile network 400 (even in the connected mode) to expedite the resolution of its IP address by local nodes. For example, MR-collocated DNS server is the default DNS server for LFNs and HMNs in mobile network 400. In the autonomous mode, an LFN/HMN resolves the IP address of VMN 402 from the hostname of VMNs 402 using standard DNS exchanges with the MR-collocated DNS server. In the autonomous mode, and optionally the connected mode, VMN 402 also uses the MR-collocated DNS server as its default server to resolve the IP address of any other node in mobile network 400 (e.g., LFN, HMN, or VMN) using standard DNS exchanges with the MR-collocated DNS server.

A VMN association created in the DNS cache is a temporary entry (i.e., associated to a timeout). VMN 402 periodically sends new DHCP requests (e.g., with the VMN FQDN option and VMN home address option) to the MR-collocated DHCP server to refresh its association in the cache of the MR-collocated DNS server. This also refreshes the lease of the care-of address of VMN 402 and the VMN routing entry in the routing table of MR 404. When VMN 402 leaves mobile network 400, the removal of its association from the cache of the MR-collocated DNS server is triggered by sending a DHCP release message (e.g., including the home address and the FQDN and of VMN 402) to the MR-collocated DHCP server. This also releases the care-of address of VMN 402 and removes the corresponding VMN routing entry in the routing table of MR 404.

Figure 5:
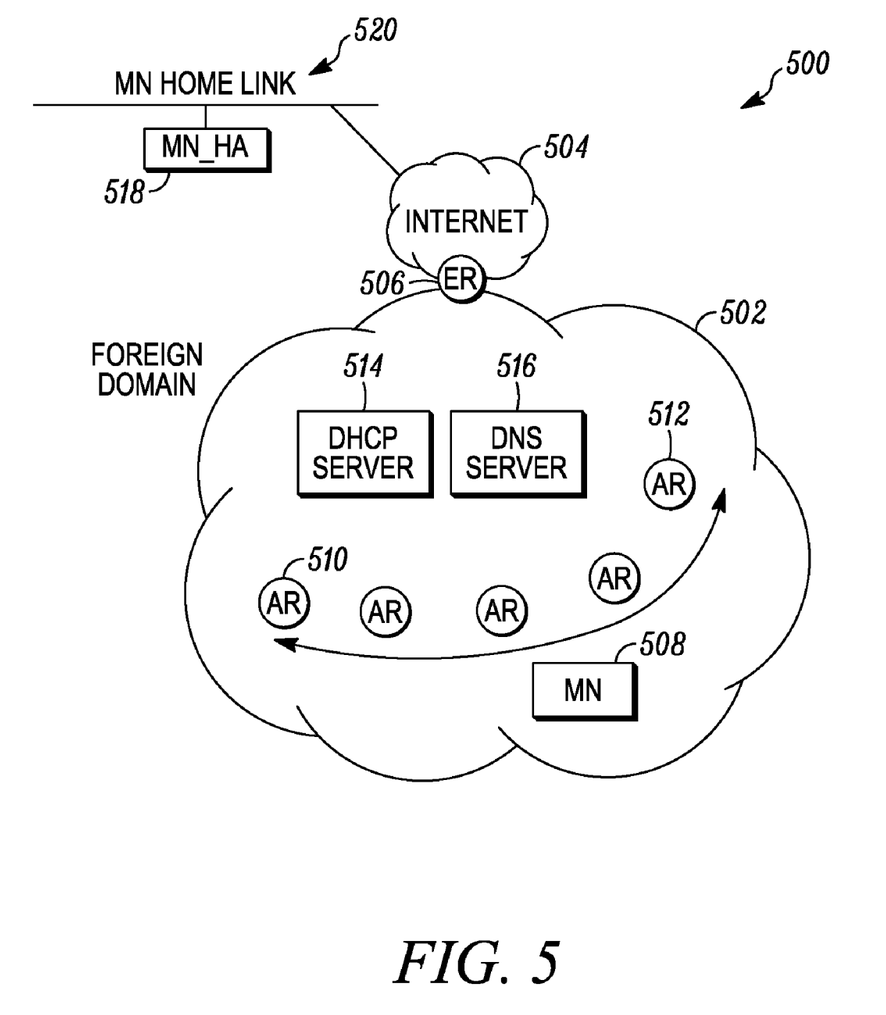
FIG. 5 is a block diagram of a fixed IP communication system.

FIG. 5 is a block diagram of a fixed IP communication system 500. IP communication system comprises an IP infrastructure 504 (e.g., the Internet) and a foreign domain 502 having an edge router (ER) 506 providing connectivity between foreign domain 502 and IP infrastructure 504. Foreign domain 502 also includes, but is not necessarily limited to, a DHCP server 514, a DNS server 516, and one or more access routers (AR) 510, 512. When an MN 508 enters foreign domain 502, MN 508 attaches or joins at one of the access routers 510, 512. MN 508 has a home agent (MN HA) 518 that is connected to IP infrastructure 504 via an MN home link 520.

Figure 6:
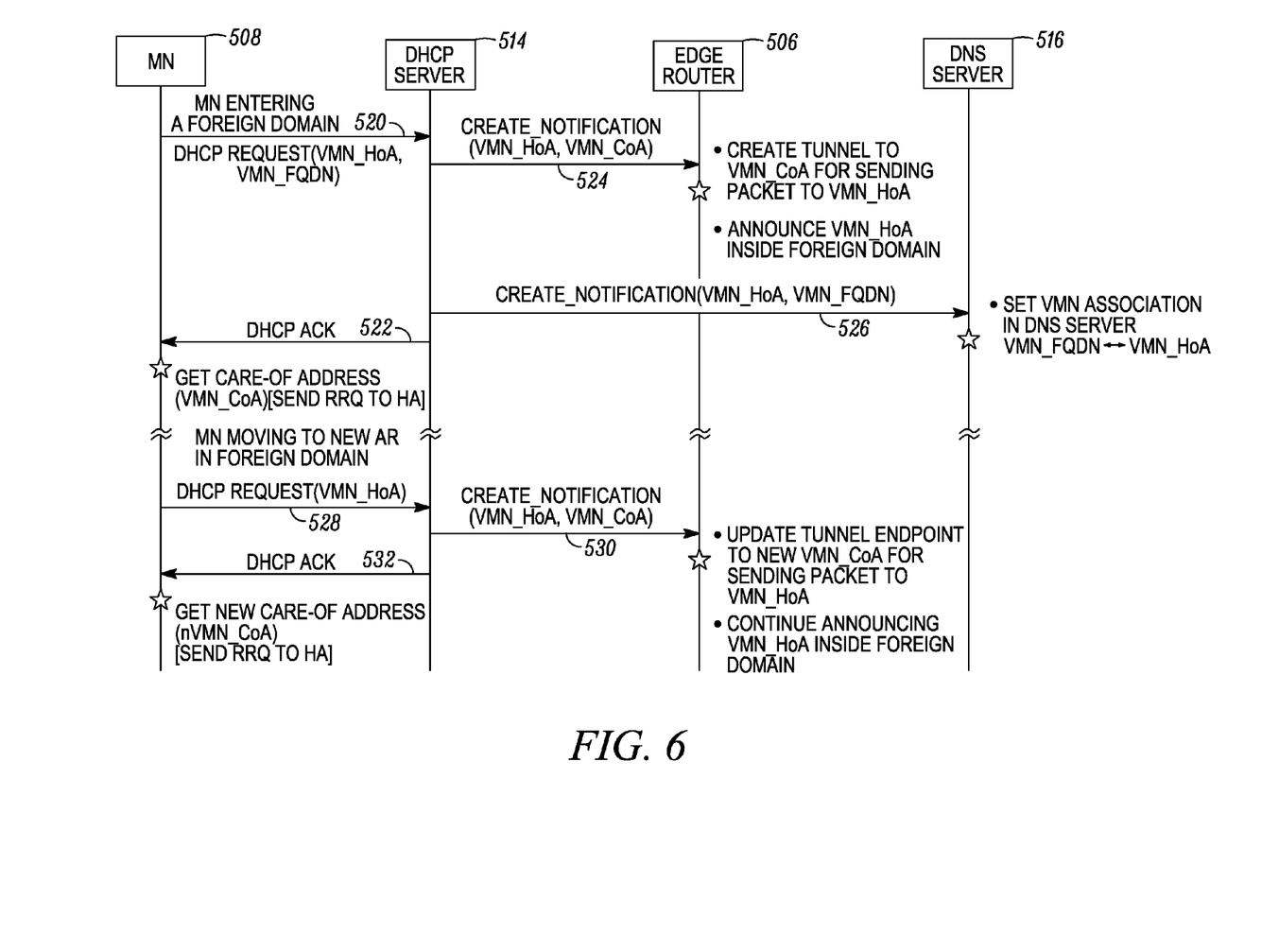
FIG. 6 is a signaling diagram illustrating an exemplary IP communication routing in the foreign domain shown in FIG. 5.

FIG. 6 is a signaling diagram illustrating an exemplary IP communication routing in the foreign domain 502 shown in FIG. 5. In this exemplary embodiment, the VMN home address option and VMN FQDN option are available for MN 508 entering foreign domain 502. MN 508 has a home address (VMN_HoA) and an FQDN (VMN_FQDN). When MN 508 enters foreign domain 502, MN 508 sends a DHCP request 520 including VMN_HoA, and optionally VMN_FQDN, to DHCP server 514, and DHCP server 514 creates and sends a notification 524 to ER 506 that includes VMN_HoA and the care-of address (VMN_CoA) allocated to MN 508. DHCP server 514 also responds to the DHCP request 508 with a DHCP acknowledgement 522, and MN 508 obtains the care-of address. Upon receiving (and accepting) the home address of MN 508, ER 506 creates a tunnel to VMN_CoA for sending packets addressed to VMN_HoA. Additionally, ER 506 announces that VMN_HoA is within foreign domain 502 enabling other nodes in foreign domain 502 to discover the presence of MN 508. With the VMN FQDN option, DHCP server 514 creates and sends a notification 526 to DNS server 516 that includes VMN_HoA and VMN_FQDN. Upon receiving this VMN FQDN option, DNS server 516 sets a VMN association between VMN_FQDN and VMN_HoA.

When MN 508 moves to a new AR (e.g., from AR 510 to AR 512), MN 508 sends another DHCP request 528 including VMN_HoA to DHCP server 514, and DHCP server 514 creates and sends a notification 530 to ER 506 that includes VMN_HoA and a new care-of address (nVMN_CoA) allocated to MN 508. DHCP server 514 also responds to the DHCP request with a DHCP acknowledgement 532, and MN 508 obtains the new care-of address. Upon receiving this VMN home address option, ER 506 updates the endpoint of the previously created tunnel to the new care-of address of MN 508 for sending packets addressed to VMN_HoA. Additionally, ER 506 continues to announce that VMN_HoA is within foreign domain 502. Upon receiving the new care-of address in the DHCP acknowledgement from DHCP server 514, MN 508 can update its Mobile IP binding to the HA of MN 508 by sending a new registration request (e.g., an RRQ message).

The use of the VMN home address option by MN 508 optimizes routing of packets between any node (fixed or mobile) in foreign domain 502 and MN 508. Routing between any node in foreign domain 502 and MN 508 is localized inside foreign domain 502 (e.g., packets do not need to be routed outside of the foreign domain). For example, packets sent by a fixed node in foreign domain 502 to the home address of MN 508 is routed natively towards ER 506. Upon receiving these packets, ER 506 determines MN 508 is visiting foreign domain 502 using the notification received from DHCP server 514 for MN 508. ER 506 then tunnels packets addressed to the home address of MN 508 towards the care-of address of MN 508 as indicated in the notification received from DHCP server 514. MN 508 decapsulates and processes the packets from the fixed node. Similarly, the use of the VMN FQDN option optimizes the name resolution procedure for the VMN FQDN inside foreign domain 502. For example, the DNS resolution of the FQDN of MN 508 into the home address of MN 508 by a node in foreign domain 502 can be performed by DNS server 516, without the need for contacting other DNS servers outside of foreign domain 502. Thus, using the VMN FQDN option speeds up the name resolution procedure.

Figure 7:
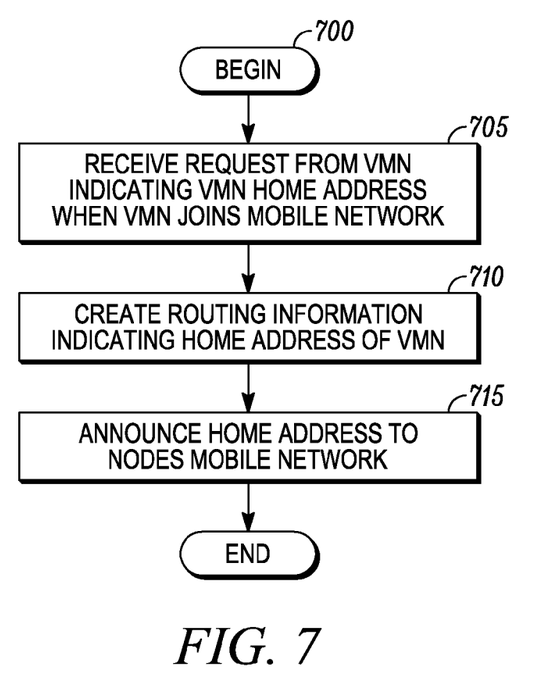
FIG. 7 is a flow diagram of a first exemplary method for establishing communication between a mobile node and a node in a mobile network in accordance with some embodiments of the invention.

FIG. 7 is a flow diagram of a first exemplary method 700 for establishing communication between a mobile node (e.g., VMNs 120, 202 shown in FIGS. 1 and 2, respectively) and a node (e.g., LFNs 108, 306 shown in FIGS. 1 and 3, respectively) in a mobile network in accordance with some embodiments of the invention. A request is received from the VMN when the VMN joins a first mobile network of the one or more mobile networks, as indicated at step 705. The request conveys the home address of the VMN (e.g., the VMN home address option) to the MR. In one exemplary embodiment, the home address of the VMN is included in a DHCP request and sent from the VMN to a DHCP server in the mobile network. The DHCP server creates and sends a notification to the MR that includes the home address of the VMN and optionally the care-of address allocated to the VMN.

In another exemplary embodiment, the FQDN of the VMN is also included in the DHCP request (e.g., using the VMN FQDN option in conjunction with the VMN home address option). The DHCP server creates a notification indicating the home address and the FQDN of the VMN and sends the notification from the DHCP server to a DNS server of the mobile network. The DNS server associates the home address of the VMN with the FQDN of the VMN in response to the notification.

Routing information is created indicating the home address of the VMN, as indicated at step 710. For example, upon receiving the notification from the DHCP server, the MR creates a VMN entry in its routing table for this VMN. The home address of the VMN is announced to the nodes of the one or more mobile networks, as indicated at step 715. For example, the MR multicasts an announcement to all other nodes of the mobile network(s) that indicates the home address of the VMN is within the mobile network or aggregation of mobile networks. In one exemplary embodiment, the MR has a DRN list and updates the DRN list to include the home address of the VMN when the DHCP request is received. The MR then sends the updated DRN list to all other nodes in the mobile network.

A release may also be received from the VMN when the VMN leaves the mobile network. In one exemplary embodiment, the VMN sends a DHCP release that includes the home address of the VMN. The routing information (i.e., the home address of the VMN) is then removed from the routing table of the MR, and the MR discontinues announcing that the VMN home address is within the mobile network. In an exemplary embodiment, the DHCP server sends a release notification to the MR, in response to receiving the DHCP release, that includes the home address of the VMN and optionally the care-of address of the VMN.

Upon receiving this notification, the MR removes the routing information for the home address of the VMN and discontinues announcing that the home address of the VMN is within the mobile network. In another exemplary embodiment, the DHCP server sends a release notification that includes the home address and the FQDN of the VMN (e.g., using the VMN FQDN option in conjunction with the VMN home address option) to the DNS server. Upon receiving this release notification, the DNS server removes the VMN association from the DNS server.

Figure 8:
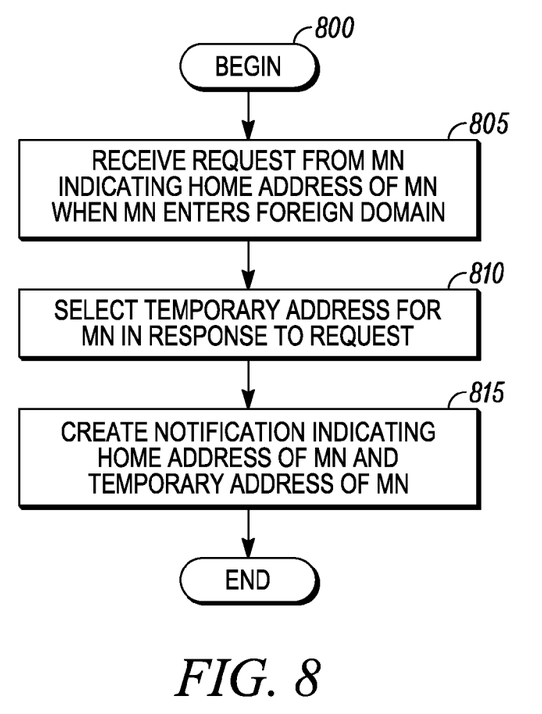
FIG. 8 is a flow diagram of a second exemplary method for establishing communication with a mobile node in a foreign domain in accordance with some embodiments of the invention.

FIG. 8 is a flow diagram of a second exemplary method 800 for establishing communication with a mobile node (e.g., MN 508 shown in FIGS. 5 and 6) in a foreign domain (e.g., foreign domain 502 shown in FIG. 5) in accordance with some embodiments of the invention. A request is received from the MN when the MN enters the foreign domain, as indicated at step 805. The request indicates the home address of the MN. In one exemplary embodiment, the home address of the MN is included in a DHCP request and sent from the MN to a DHCP server in the foreign domain when the MN attaches to an access router of the foreign domain. A care-of address is selected for the MN in response to the request, as indicated at step 810. For example, the DHCP server sends a DHCP acknowledgement to the MN in response to the DHCP request, and the DHCP acknowledgement indicates the care-of address allocated to the MN. A notification, indicating the home address and optionally the care-of address of the MN, is created, as indicated at step 815. For example, the DHCP server creates and sends a notification to an ER of the foreign domain that includes the home address of the MN and, optionally, the care-of address allocated to the MN.

In one exemplary embodiment, a first notification is created (e.g., by the DHCP server), upon receiving the DHCP request, that indicates the home address of the MN and the care-of address of the MN, and sent to the ER. In response to the first notification, the ER creates a tunnel to the care-of address of the MN, for sending packets address to the home address of the MN, and sends an announcement that the home address of the MN is within the foreign domain. A second notification may be created (e.g., by the DHCP server), upon receiving the DHCP request, that indicates the home address and the FQDN of the MN, and sent to a DNS server of the foreign domain. In response to the second notification, the DNS server sets a VMN association in the DNS server between the FQDN of the MN and the home address of the MN.

When the MN moves to a different access router in the foreign domain, the MN sends another DHCP request (e.g., another DHCP request), indicating the home address of the MN, to the DHCP server. Upon receiving the DHCP request, a new care-of address is selected by the DHCP server and provided to the MN. The DHCP server creates a notification, indicating the home address of the MN and the new care-of address of the MN, and sends the notification to the ER. In response to this notification, the ER updates the endpoint of the previously created tunnel with the new care-of address for sending packets addressed to the home address of the MN. Additionally, the ER continues to announce that the home address of the MN is within the foreign domain.

Figure 9:
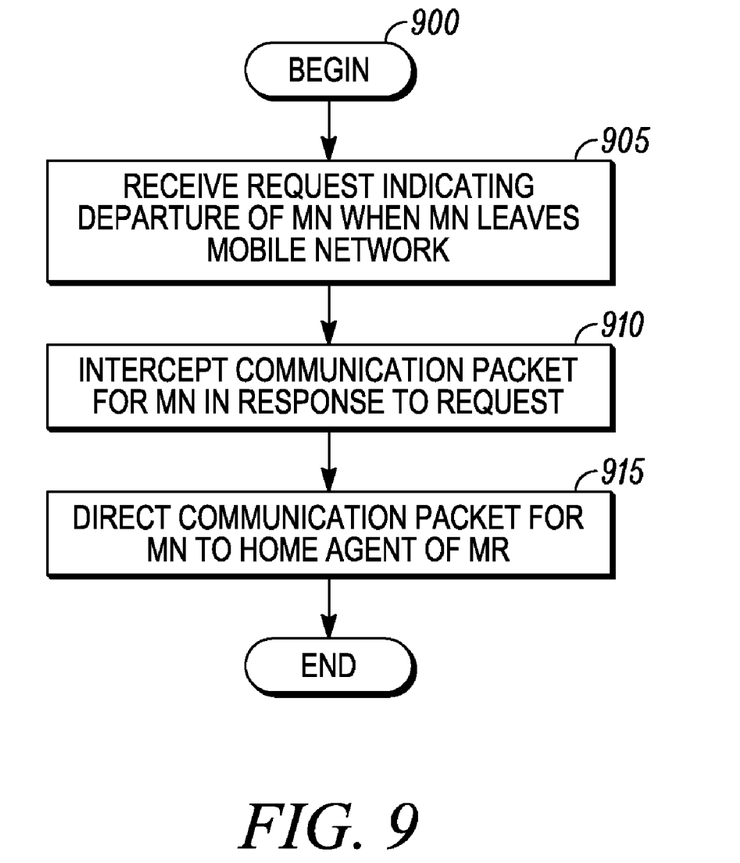
FIG. 9 is a flow diagram of a third exemplary method for establishing communication between a mobile node and a node in a mobile network in accordance with some embodiments of the invention.

FIG. 9 is a flow diagram of a third exemplary method 900 for establishing communication between a mobile node (e.g., HMN 302 shown in FIG. 3) and a node in a mobile network in accordance with some embodiments of the invention. In this exemplary embodiment, the DHCP server and DNS server are collocated with the MR. A request, indicating a departure of an HMN, is received when the HMN leaves its home mobile network, as indicated at step 905. For example, a DHCP request, that includes the home address of the HMN and departure information of the HMN, is sent to a MR of the mobile network. This DHCP request may be sent by the HMN prior to leaving the mobile network or just after leaving the mobile network. The MR replies to the DHCP request with a DHCP acknowledgement. Additionally, the MR renews the lease for the home address of the HMN and initiates ARP proxying for the home address of the HMN and tunneling to the home agent of the HMN.

Communication packets for the HMN are intercepted in response to the request, as indicated at step 910. The communication packets for the HMN are directed to the home agent of the MR, which is also the home agent of the HMN, as indicated at step 915.

By localizing the routing of IP communications within the mobile network 102, 200, 300, 400 between the VMN home address and any other node in the mobile network 102, 200, 300, 400, this IP communication is enabled when the mobile network 102, 200, 300, 400 is disconnected from the IP infrastructure (e.g., in autonomous mode), and the routing path is optimized when the mobile router 104 is connected to the IP infrastructure. Additionally, any node in the mobile network 102, 200, 300, 400, in autonomous mode, can DNS-resolve the hostname (e.g., the FQDN) of the VMN into the home address of the VMN.

In the foregoing specification, specific embodiments of the present invention have been described. However, one of ordinary skill in the art appreciates that various modifications and changes can be made without departing from the scope of the present invention as set forth in the claims below. For example, while the description above describes communication between nodes in an autonomous aggregation of networks, it should be appreciated that these concepts can also be applied, for example, to aggregations of networks having IP connectivity and having a fully nested, flat, mixed, or other aggregation configuration.

Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method for establishing internet protocol communication between a visiting mobile node and a node in one or more mobile networks having a plurality of nodes, the visiting mobile node having a home address, the method comprising:

receiving, by a mobile router in a first mobile network of the one or more networks, a request from the visiting mobile node when the visiting mobile node joins the first mobile network, the request indicating the home address of the visiting mobile node;

determining whether the first mobile network, which is connected to the Internet or autonomous at different times, is presently Internet-connected or is autonomous, wherein the mobile network is disconnected from an Internet Protocol (IP) infrastructure when autonomous;

deciding whether to alter the manner of addressing communications to and from the visiting mobile node based on the determination;

creating routing information indicating the home address of the visiting mobile node; and announcing the home address to the plurality of nodes of the one or more mobile networks.

2. A method according to claim 1, wherein the one or more mobile networks comprises a dynamic host configuration protocol server; and wherein the request is a dynamic host configuration protocol request; and wherein said creating step comprises creating a notification, the notification indicating the home address of the visiting mobile node.

3. A method according to claim 2, further comprising sending the notification from the dynamic host configuration protocol server to the mobile router prior to said announcing step.

4. A method according to claim 1, wherein the one or more mobile networks comprises a dynamic host configuration protocol server, the dynamic host configuration protocol server selecting a temporary address for the visiting mobile node in response to the request from the visiting mobile node; and wherein said creating step comprises creating a notification, the notification indicating the home address of the visiting mobile node and the temporary address of the visiting mobile node.

5. A method according to claim 1, wherein the one or more mobile networks comprises a dynamic host configuration protocol server and a domain name system server; wherein the visiting mobile node has a fully qualified domain name; and wherein said creating step comprises:

creating a notification, the notification indicating the home address of the visiting mobile node and the fully qualified domain name of the visiting mobile node; and sending the notification from the dynamic host configuration protocol server to the domain name system server, the domain name system server associating the home address of the visiting mobile node with the fully qualified domain name of the visiting mobile node in response to the notification.

6. A method according to claim 1, wherein the mobile router has a routing table comprising the routing information; and wherein the method further comprises:

receiving a release from the visiting mobile node when the visiting mobile node leaves the first mobile network of the one or more mobile networks, the release indicating the home address of the visiting mobile node;

removing the routing information for the home address of the visiting mobile node from the routing table of the mobile router; and discontinuing said announcing step.

7. A method according to claim 6, wherein the one or more mobile networks further comprises a dynamic host configuration protocol server; and wherein said removing step comprises sending a first notification from the dynamic host configuration protocol server to the mobile router, the first notification indicating the home address of the visiting mobile node.

8. A method according to claim 7, wherein the visiting mobile node has a fully qualified domain name; wherein the one or more mobile networks further comprises a domain name system server having an association between the home address of the visiting mobile node and the fully qualified domain name of the visiting mobile node; and wherein said sending step comprises sending a second notification from the dynamic host configuration protocol server to the domain name system server, the second notification indicating the home address of the visiting mobile node and the fully qualified domain name of the visiting mobile node, the domain name system server removing the association between the home address of the visiting mobile node and the fully qualified domain name of the visiting mobile node in response to the second notification.

9. A method according to claim 1, wherein the first mobile network is autonomous; wherein the one or more mobile networks comprises a domain name system server; wherein the visiting mobile node has a fully qualified domain name; wherein the request indicates the home address of the visiting mobile node and the fully qualified domain name of the visiting mobile node; wherein said creating step comprises associating the home address of the visiting mobile node with the fully qualified domain name of the visiting mobile node.

10. A method according to claim 1, wherein the first mobile network is autonomous; wherein the one or more mobile networks comprises a domain name system server, the domain name system server having a cache; wherein the visiting mobile node has a fully qualified domain name; wherein the request indicates the home address of the visiting mobile node and the fully qualified domain name of the visiting mobile node; and wherein said creating step comprises associating the fully qualified domain name of the visiting mobile node with the home address of the visiting mobile node in the cache of the domain name system server.

11. A method according to claim 1, wherein the one or more mobile networks comprises a domain name system server, the mobile router having a directly reachable network list; and wherein the method further comprises:

adding the home address of the visiting mobile node to the directly reachable network list; and sending the directly reachable network list to the plurality of nodes of the one or more mobile networks.

12. A method according to claim 1, further comprising deciding, when network has been autonomous and recovers Internet connectivity, whether to maintain localized routing for the home address of the visiting mobile node or whether to switch to tunneled routing.

13. A method according to claim 12, wherein the mobile router provides the intelligence to decide whether localized routing or tunneled routing is to be employed when Internet connectivity is recovered and to only select localized routing when Internet connectivity is lost.

14. A method according to claim 13, further comprising if localized routing is not maintained, removing the home address of the visiting mobile node from a routing table of the mobile router and a list of directly reachable networks, and then sending a new mobile network announcement updating connectivity information of the visiting mobile node.

15. A method according to claim 13, wherein the decision of whether to employ localized or tunneled routing is a policy-based decision.

16. A method for establishing an internet protocol communication for a mobile node in a foreign domain, the mobile node having a home address, the method comprising:

receiving a request, by a first router in the foreign domain, from the mobile node when the mobile node enters the foreign domain, the request indicating the home address of the mobile node;

determining whether the foreign domain is Internet-connected or is autonomous wherein the foreign domain is disconnected from an Internet Protocol (IP) infrastructure when autonomous;

deciding whether to alter the manner of addressing the mobile node based on the determination;

selecting a temporary address for the mobile node in response to the request; and creating a first notification indicating the home address of the mobile node and the temporary address of the mobile node.

17. A method according to claim 16, wherein the foreign domain comprises the first router having connectivity to the Internet when the foreign domain is Internet-connected; and wherein the method further comprises:

sending the first notification to the first router;

creating a route for the home address of the mobile node based on the temporary address of the mobile node;

announcing the home address inside the foreign domain; and sending an acknowledgement to the mobile node in response to the request, the acknowledgement indicating the temporary address of the mobile node.

18. A method according to claim 17, wherein the mobile node has a fully qualified domain name; wherein the foreign domain comprises a domain name system server; and wherein the method further comprises:

creating a second notification indicating the home address of the mobile node and the fully qualified domain name of the mobile node;

sending the second notification to the domain name system server; and associating the fully qualified domain name of the mobile node with the home address of the mobile node in response to the second notification.

19. A method according to claim 16, wherein the foreign domain comprises a dynamic host configuration protocol server; wherein the request is a dynamic host configuration protocol request; and wherein said receiving step comprises receiving the dynamic host configuration protocol request from the mobile node by the dynamic host configuration protocol server.

20. A method according to claim 16, wherein the foreign domain comprises second and third routers; wherein said receiving step comprises receiving a first request when the mobile node moves to the second router; wherein said selecting comprises selecting a first temporary address in response to the first request; wherein said creating step comprises creating the first notification indicating the home address of the mobile node and the first temporary address; and wherein the method further comprises:

receiving a second request when the mobile node moves to the third router;

selecting a second temporary address in response to the second request; and creating a second notification indicating the home address of the mobile node and the second temporary address of the mobile node.

21. A method for establishing an internet protocol communication for a mobile node in one or more mobile networks, the one or more mobile networks comprising a mobile router, the mobile node having a home address, the mobile router having a home agent, the method comprising:

receiving, by the mobile router, a request when the mobile node leaves a first mobile network of the one or more mobile networks, the request indicating a departure of the mobile node;

determining whether the one or more mobile networks is Internet-connected or is autonomous, wherein the one or more mobile networks is disconnected from an Internet Protocol (IP) infrastructure when autonomous;

deciding how addressing is to be handled based on the determination, the addressing when the one or more mobile networks is Internet-connected selected to be the same as or different than when the one or more mobile networks is autonomous;

intercepting a communication packet for the mobile node in response to the request; and directing the communication packet for the mobile node to the home agent of the mobile router if the one or more mobile networks is Internet-connected.

22. A system for routing communication between a mobile node and one or more nodes of a network, the mobile node having a home address, the system comprising:

a router configured to:

determine whether a connection exists to the Internet or the router is autonomous, wherein the router is disconnected from an Internet Protocol (IP) infrastructure when autonomous;

decide how addressing is to be handled based on the determination, the addressing when the router is Internet-connected selected to be the same as or different than when the router is autonomous;

receive a request for a temporary address from the mobile node, said request comprising the home address of the mobile node;

create routing information indicating the home address of the mobile node; and announce the home address of the mobile node to the one or more nodes of the network.

23. A system according to claim 22 further comprising a processing device configured to:

create a notification upon receiving said request, said notification indicating the home address of the mobile node; and send said notification to said router; and wherein said router has a routing table and is further configured to:

create an entry in said routing table indicating the home address of the mobile node as directly reachable via said router; and route packets to the home address of mobile node.

24. A system according to claim 22, wherein the mobile node has a fully qualified domain name; wherein said request further comprises the fully qualified domain name of the mobile node; wherein said router is further configured to create a notification indicating an association between the fully qualified domain name of the mobile node and the home address of the mobile node; and wherein the system further comprises a domain name system server configured to:

receive said notification from said router; and store said association between the fully qualified domain name of the mobile node and the home address of the mobile node.

* * * * *